United States Patent
Axmon et al.

(10) Patent No.: US 10,667,197 B2
(45) Date of Patent: *May 26, 2020

(54) IN-FLIGHT CELLULAR COMMUNICATIONS SYSTEM COVERAGE OF MOBILE COMMUNICATIONS EQUIPMENT LOCATED IN AIRCRAFT

(71) Applicant: Telefonaktiebolaget LM Ericsson (publ), Stockholm (SE)

(72) Inventors: Joakim Axmon, Limhamn (SE); Peter Alriksson, Horby (SE); Bjorn Ekelund, Bjarred (SE); Bengt Lindoff, Bjarred (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 99 days.

This patent is subject to a terminal disclaimer.

(21) Appl. No.: 15/772,858

(22) PCT Filed: Sep. 23, 2016

(86) PCT No.: PCT/EP2016/072624
§ 371 (c)(1),
(2) Date: May 2, 2018

(87) PCT Pub. No.: WO2017/076550
PCT Pub. Date: May 11, 2017

(65) Prior Publication Data
US 2018/0332522 A1    Nov. 15, 2018

Related U.S. Application Data

(63) Continuation of application No. 14/931,057, filed on Nov. 3, 2015, now Pat. No. 9,813,969.

(51) Int. Cl.
*H04W 4/00* (2018.01)
*H04W 36/32* (2009.01)
(Continued)

(52) U.S. Cl.
CPC ........ *H04W 36/32* (2013.01); *H04B 7/18506* (2013.01); *H04W 4/42* (2018.02);
(Continued)

(58) Field of Classification Search
CPC ....... H04W 36/32; H04W 4/42; H04W 16/28; H04W 36/00; H04W 84/06
See application file for complete search history.

(56) References Cited

U.S. PATENT DOCUMENTS

| 8,688,101 B1 | 4/2014 | Hayes et al. |
| 8,914,022 B2 | 12/2014 | Kostanic et al. |

(Continued)

FOREIGN PATENT DOCUMENTS

| CN | 103873133 A | 6/2014 |
| CN | 204013537 U | 12/2014 |

(Continued)

OTHER PUBLICATIONS

Japanese Office Action dated Apr. 19, 2019 in connection with Japanese Application No. 2018-522731, 3 pages.

(Continued)

*Primary Examiner* — Abdelnabi O Musa
(74) *Attorney, Agent, or Firm* — Leffler Intellectual Property Law, PLLC

(57) ABSTRACT

A network node of a terrestrial cellular system provides telecommunications service to a user equipment (UE) in an airborne aircraft. Navigation information transmitted from the aircraft is periodically acquired, including aircraft identity, position, altitude, and a time of determining aircraft position. A link is maintained between the network node and the UE by transmitting beam steered, Doppler shift compensated downlink signals, and by performing beam steered reception of uplink signals. Beam steering is directed toward the aircraft based on the navigation information. Doppler (Continued)

shift compensation is adapted to compensate for a Doppler shift such that the UE experiences a nominal carrier frequency when receiving transmissions from the antenna nodes. Handover from a first to a second coverage area includes using a same cell identifier and a same frequency allocation in the second coverage area as are used in the first.

23 Claims, 10 Drawing Sheets

(51) Int. Cl.
  *H04W 36/00* (2009.01)
  *H04B 7/185* (2006.01)
  *H04W 16/28* (2009.01)
  *H04W 72/04* (2009.01)
  *H04W 4/42* (2018.01)
  *H04W 84/06* (2009.01)
  *H04W 64/00* (2009.01)

(52) U.S. Cl.
  CPC ........... *H04W 16/28* (2013.01); *H04W 36/00* (2013.01); *H04W 36/0061* (2013.01); *H04W 72/0406* (2013.01); *H04W 64/006* (2013.01); *H04W 84/06* (2013.01)

(56) References Cited

U.S. PATENT DOCUMENTS

| | | | |
|---|---|---|---|
| 9,008,669 B2 | 4/2015 | Hyslop et al. | |
| 2006/0030311 A1* | 2/2006 | Cruz | H01Q 1/246 455/431 |
| 2006/0229077 A1* | 10/2006 | Monk | H01Q 1/283 455/442 |
| 2006/0239238 A1 | 10/2006 | Fernandez-Corbaton et al. | |
| 2007/0161347 A1 | 7/2007 | Ma et al. | |
| 2008/0154448 A1* | 6/2008 | Mead | G06Q 50/00 701/14 |
| 2009/0186611 A1 | 7/2009 | Stiles et al. | |
| 2011/0182230 A1 | 7/2011 | Ohm et al. | |
| 2011/0189943 A1 | 8/2011 | Ilarregui et al. | |
| 2014/0177461 A1 | 6/2014 | Seyedmehdi et al. | |
| 2014/0266896 A1 | 9/2014 | Hyslop | |
| 2015/0098415 A1 | 4/2015 | Chen | |
| 2015/0146692 A1 | 5/2015 | Yi et al. | |
| 2016/0212669 A1 | 7/2016 | Davis | |
| 2017/0111771 A1* | 4/2017 | Haque | H04B 7/18506 |
| 2017/0127332 A1 | 5/2017 | Axmon et al. | |
| 2017/0155442 A1 | 6/2017 | Hommel et al. | |

FOREIGN PATENT DOCUMENTS

| | | |
|---|---|---|
| EP | 1976152 A1 | 10/2008 |
| EP | 2161855 A1 | 3/2010 |
| EP | 2214328 A2 | 8/2010 |
| EP | 2278732 A2 | 1/2011 |
| JP | 2008146450 A | 6/2008 |
| JP | 2012502527 A | 1/2012 |
| WO | 9945609 A1 | 9/1999 |
| WO | 2006105316 A2 | 10/2006 |
| WO | 2013010370 A1 | 1/2013 |

OTHER PUBLICATIONS

English language Summary of Japanese Office Action dated Apr. 19, 2019 in connection with Japanese Application No. 2018-522731, 2 pages.

PCT International Search Report, dated Jan. 23, 2017, in connection with International Application No. PCT/EP2016/075683, all pages—Previously cited in parent U.S. Appl. No. 14/931,057.

Non-Final Office Action dated Apr. 28, 2017 in connection with U.S. Appl. No. 14/931,063, 33 pages—Previously cited in parent U.S. Appl. No. 14/931,057.

ETSI TR 101 599 V1.1.3 (Sep. 2012), Electromagnetic compatibility and Radio spectrum matters (ERM) System Reference Document (SRDoc); Broadband Direct-Air-to-Ground Communications System employing beamforming antennas, operating in the 2,4 GHz and 5,8 GHz bands, 31 pages—Previously cited in parent U.S. Appl. No. 14/931,057.

ETSI TR 103 054 V1.1.1 (Jul. 2010), Electromagnetic compatibility and Radio spectrum Matters (ERM); System Reference Document; Broadband Direct-Air-to-Ground Communications operating in part of the frequency range from 790 MHz to 5 150 MHz, 23 pages—Previously cited in parent U.S. Appl. No. 14/931,057.

ETSI TR 103 108 V1.1.1 (Jul. 2013), Electromagnetic compatibility and Radio spectrum Matters (ERM); System Reference document (SRdoc); Broadband Direct-Air-to-Ground Communications System operating in the 5,855 GHz to 5,875 GHz band using 3G technology, 25 pages—Previously cited in parent U.S. Appl. No. 14/931,057.

PCT International Search Report, dated Dec. 19, 2016, in connection with International Application No. PCT/EP2016/072624, all pages.

PCT Written Opinion, dated Dec. 19, 2016, in connection with International Application No. PCT/EP2016/072624, all pages.

Yogesh Nijsure et al., "Adaptive Air-to-Ground Secure Communication System based on ADS-B and Wide Area Multilateration", IEEE Transactions on Vehicular Technology, Aug. 2015, 17 pages.

* cited by examiner

IN-FLIGHT CELLULAR COMMUNICATIONS SYSTEM COVERAGE OF MOBILE COMMUNICATIONS EQUIPMENT LOCATED IN AIRCRAFT

CROSS-REFERENCE TO RELATED APPLICATIONS

This application is a 371 national stage of International PCT/EP2016/072624, filed Sep. 23, 2016, which claims the benefit of U.S. application Ser. No. 14/931,057 filed Nov. 3, 2015 (which issued as U.S. Pat. No. 9,813,969 on Nov. 7, 2017). All of these earlier applications are hereby incorporated herein by reference in their entireties.

BACKGROUND

The present invention relates to connectivity between land-based cellular communications systems and user equipment located in air-borne craft.

The world is becoming more and more connected, and this has led consumers to have increasing expectations of being able to be online and experience at least moderate data rates regardless of time and location. As one response to these expectations, the next generation of mobile technology, the so-called IMT-2020 (5G), targets high-speed mobility as one objective. The exemplary scenarios studied are high-speed trains and vehicles on freeways, but following the recent trend, it is expected that terrestrial in-flight broadband service for airplanes will be in the scope—either as direct communication between the User Equipment (UE) and base station, or via an access point (AP) onboard the aircraft which aggregates the traffic of some number of UEs and maintains a link to the base station.

In 2013 the Federal Communications Commission (FCC) took steps towards enabling better connectivity by assigning a 500 MHz wide subband in the 14 GHz radiofrequency (RF) band for in-flight air-to-ground broadband connection. The FCC's expectation is that by year 2021 there will be a demand for 15000 flights offering high-speed broadband connectivity to its passengers. By comparison, the availability in year 2013 was 3000 airplanes world-wide, and this was with connections that were deemed too slow and by far too expensive by consumers. The industry has noted that today's airline passengers expect the same level of broadband service that is available on the ground.

Several trials have been carried out offering terrestrial network coverage in lower frequency bands typically used for regular cellular networks. Recent advances on the regulatory side of aviation will, if properly exploited, greatly enhance and simplify in-flight broadband services that are based on terrestrial networks.

The two main systems in use today for air-to-ground communications are:
  Aircraft Communications Addressing and Reporting System (ACARS), and
  Future Air Navigation System (FANS),
Of the two, FANS is the more modern and will replace ACARS, offering, for example, Internet Protocol (IP)-based air traffic controller-pilot data link communication (CPDLC) over the Aeronautical Telecommunications Network (ATN).

The air-to-ground communication is either towards a ground station or, in the absence of coverage, a satellite.

Conventional technology exists for providing aircraft-borne devices access to terrestrial radio systems. For example, U.S. Pat. No. 8,914,022B2 discloses directing RF beams towards an aircraft to provide a terrestrial unidirectional or bidirectional broadband data link in parallel with the existing ACARS link. Moreover, depending on whether the data transfers are heavy on the uplink or the downlink, one can split the uplink and downlink radio spectrum resources proportionally to the load. In case there is more than one data link served by an RF beam, of which there may be several in a cell, the radio resources can be arbitrated and shared using time-division multiplexing (TDM). It is however required that there already be a bidirectional ACARS link (short message link) over which the establishment of the parallel data link can be initiated.

There are drawbacks associated with the technology described by U.S. Pat. No. 8,914,022B2. For example, the terrestrial network operator has to rely on an ACARS communication link operated by a third party. Likely, the terrestrial network operator also has to rely on positioning information at least initially provided by the same third party, before the same information can be conveyed over the terrestrial network operator's link; otherwise beams will have to be active in all directions all the time to allow airplanes entering the coverage to identify the network and carry out random access.

Taking another example, U.S. Pat. No. 9,008,669B2 teaches that one can use adaptive beamforming in a terrestrial radio access network so that coverage tracks airplane movement. Moreover, it is taught that for the purpose of estimating and compensating for Doppler shifts, one may, onboard the airplane, provide GPS information or positioning information from the navigation system to the wireless communication device, which may additionally convey such information to the ground station.

There are drawbacks associated with the technology described in U.S. Pat. No. 9,008,669B2. For example, it is proposed that information about position, altitude and speed is to be provided by the wireless communication device to the base station on the ground. But a problem is that before the link has been established, no such information can be conveyed. Either the terrestrial network operator has to rely on a third party, at least for initial positioning of the airplane, or else beams will have to be active in all directions all the time to allow airplanes entering the coverage to identify the network and carry out random access.

Conventional technology therefore suffers from at least the following problems:
  Involving a third party complicates the business model for the terrestrial operator, and may incur unnecessary expenses such as payment per established link or received positioning information. The third party may also refuse to provide the service requested by the terrestrial network operator.
  Always providing coverage in all directions to allow airplanes entering the coverage area to identify the terrestrial network and to carry out random access is energy inefficient.

Hence there is a need for technology by which the terrestrial network operator does not depend on a third party. There is a further need for technology in which beams are transmitting only towards existing airplanes. There is a still further need to provide cellular communication service to airborne transceiver equipment in a manner that provides seamless coverage over a wide geographic area without requiring the transceiver equipment to perform any special operations to accommodate for its velocity and airborne position.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

Moreover, reference letters may be provided in some instances (e.g., in the claims and summary) to facilitate identification of various steps and/or elements. However, the use of reference letters is not intended to impute or suggest that the so-referenced steps and/or elements are to be performed or operated in any particular order.

In accordance with one aspect of the present invention, the foregoing and other objects are achieved in technology that provides cellular telecommunications system service by a first network node of a terrestrial cellular telecommunications system to a user equipment situated in a first aircraft that is in-flight. This involves periodically acquiring, via an aircraft navigation broadcast receiver, acquired navigation information transmitted from the first aircraft, wherein the acquired navigation information comprises an identity of the first aircraft; a position of the first aircraft; an altitude of the first aircraft; and a time value indicating when the position of the first aircraft was determined. A first link between the first network node and the user equipment is maintained by transmitting beam steered, Doppler shift compensated downlink signals, and by performing beam steered reception of uplink signals. Beam steering is directed toward the first aircraft based on the periodically acquired navigation information. Doppler shift compensation is based on one or more determinations of relative velocity between the first aircraft and one or more first antenna nodes associated with the first network node, and is adapted to compensate for a Doppler shift experienced by the user equipment such that the user equipment experiences a nominal carrier frequency when receiving transmissions from the one or more first antenna nodes. The technology is able to detect that the first aircraft will be leaving a first coverage area that is served by the one or more first antenna nodes and will be entering a second coverage area that is served by one or more second antenna nodes, and then responding by causing the one or more second antenna nodes to provide a second link between the user equipment and the one or more second antenna nodes using a same cell identifier and a same frequency allocation to the user equipment as are being used for the first link so that handover from the one or more first antenna nodes to the one or more second antenna nodes is carried out without informing the user equipment.

In an aspect of some but not necessarily all embodiments, providing the coverage comprises fine-tuning beam-forming for downlink transmissions by using two partially overlapping beams for uplink reception and determining therefrom whether accuracy of prediction of position and altitude of the first aircraft can be improved.

In some alternative embodiments, providing the coverage comprises fine-tuning beam-forming for downlink transmissions by perturbing a present prediction of position and altitude of the first aircraft in a controlled manner and detecting whether uplink reception improves or degrades, and adjusting a beam-forming prediction model based on said detecting.

In another aspect of some but not necessarily all embodiments, providing the coverage comprises serving, via a third link, a second user equipment situated in a second aircraft that is in-flight, wherein the third link is supported by a beam of downlink transmissions and beam-steered reception of uplink transmissions, all directed at the second aircraft, and wherein the third link uses a different cell identifier than is being used for the first link. Some but not necessarily all of these embodiments further include, in response to the beam of downlink transmissions and beam-steered reception of uplink transmissions directed at the second aircraft being oriented in a same direction as a beam of downlink transmissions and beam-steered reception of uplink transmissions directed at the first aircraft, employing carrier aggregation techniques in which:

the beam of downlink transmissions and beam-steered reception of uplink transmissions directed at the first aircraft is associated with a first set of spectral resources;

the beam of downlink transmissions and beam-steered reception of uplink transmissions directed at the second aircraft is associated with a second set of spectral resources, different from the first set of spectral resources;

the first set of spectral resources are allocated as primary cell resources to the user equipment aboard the first aircraft and are allocated as secondary cell resources to the user equipment aboard the second aircraft; and the second set of spectral resources are allocated as primary cell resources to user equipment aboard the second aircraft and are allocated as secondary cell resources to user equipment aboard the first aircraft.

In another aspect of some but not necessarily all embodiments, providing the coverage comprises prior to activating transmission of beam steered, Doppler shift compensated downlink signals, periodically acquiring, via the aircraft navigation broadcast receiver, initially acquired navigation information transmitted from the first aircraft; and predicting, from the initially acquired navigation information, that the aircraft will, at a predicted time, enter an outer perimeter of the coverage area that is under control of the network node. The maintaining of the first link is activated at the predicted time. In some but not necessarily all of these embodiments, activating the maintaining of the first link at the predicted time comprises using the identity of the first aircraft to determine whether the first aircraft is to be served when crossing the outer perimeter of the coverage area that is under control of the network node.

In another aspect of some but not necessarily all embodiments, providing the coverage comprises determining, from the relative velocity of the first aircraft towards the one or more first antenna nodes, a Doppler shift predicted to be experienced by the one or more first antenna nodes when receiving signals transmitted by the user equipment; and applying Doppler shift compensation to a random access preamble received from the user equipment, wherein the applied Doppler shift compensation is based on the Doppler shift predicted to be experienced by the one or more first antenna nodes when receiving signals transmitted by the user equipment.

In another aspect of some but not necessarily all embodiments, providing the coverage comprises detecting an amount of Doppler shift in a random access preamble received from the user equipment; and applying Doppler shift compensation to the random access preamble received from the user equipment, wherein the applied Doppler shift compensation is based on the detected amount of Doppler shift in the random access preamble received from the user equipment.

In yet another aspect of some but not necessarily all embodiments, providing the coverage comprises ceasing maintenance of the first link in response to one or more of:

the first network node detecting that the first aircraft has left the outer perimeter of the coverage area that is under control of the first network node; and the first network node no longer receiving navigation information from the aircraft.

In yet another aspect of some but not necessarily all embodiments, providing the coverage comprises serving, via a second link, a second user equipment situated in a second aircraft that is in-flight, wherein the second link is supported by a beam of downlink transmissions and beam-steered reception of uplink transmissions, all directed at the second aircraft, and wherein:

the beam of downlink transmissions and beam-steered reception of uplink transmissions, all directed at the second aircraft does not overlap with a beam of downlink transmissions and beam-steered reception of uplink transmissions directed at the first aircraft; and a cell identifier used for the first link is the same as a cell identifier used for the second link.

BRIEF DESCRIPTION OF THE DRAWINGS

The objects and advantages of the invention will be understood by reading the following detailed description in conjunction with the drawings in which.

DETAILED DESCRIPTION

Figure 1:
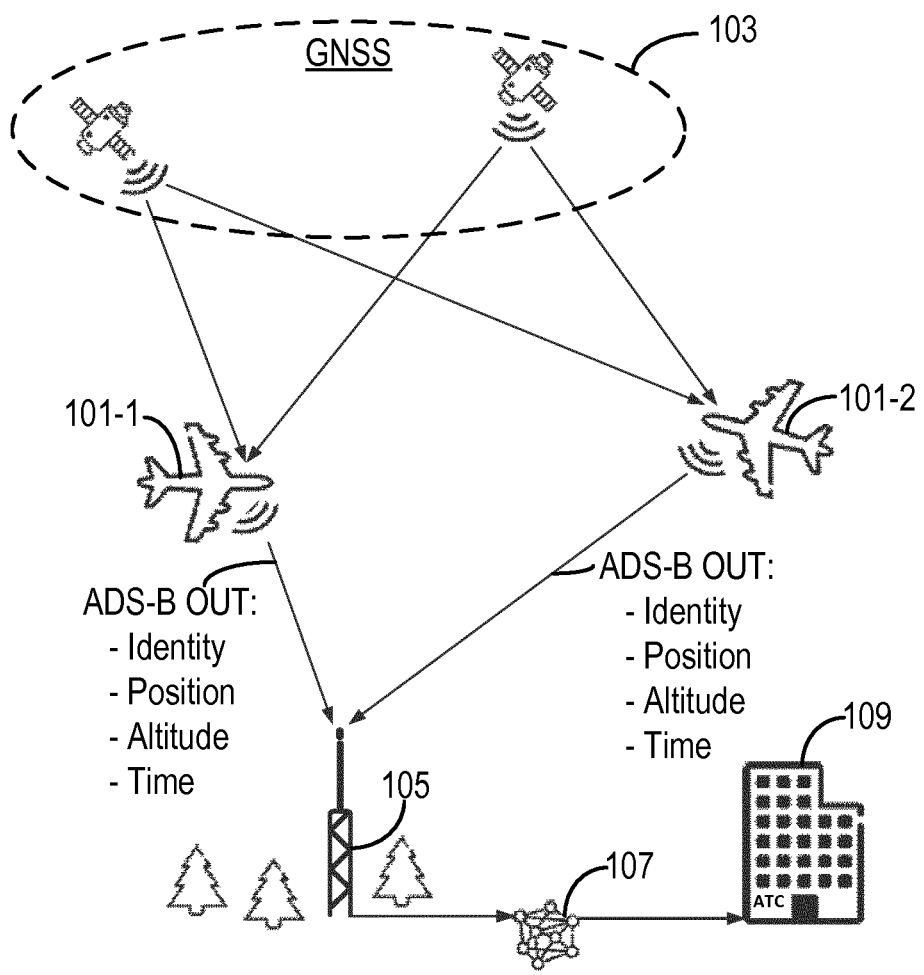
FIG. 1 illustrates an ADS-B deployment.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits alone or in combination with one or more programmed processors). Moreover, the invention can additionally be considered to be embodied entirely within any form of nontransitory computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

With respect to terminology used herein, in some embodiments the non-limiting term UE is used. The UE herein can be any type of wireless device capable of communicating with a network node or another UE over radio signals. The UE may also be a radio communication device, target device, device to device UE, machine type UE or UE capable of machine to machine communication, a sensor equipped with UE, Tablet, mobile terminal, smart phone, laptop embedded equipment (LEE), laptop mounted equipment (LME), USB dongle, Customer Premises Equipment (CPE), and the like.

Also in some embodiments generic terminology, "radio network node" or simply "network node (NW node)", is used. This can be any kind of network node which may comprise any one or more of: a base station, a radio base station, a base transceiver station, a base station controller, a network controller, an evolved Node B (eNB), a Node B, a radio network controller (RNC), a relay node, a positioning node, an Evolved Serving Mobile Location Centre (E-SMLC), a location server, a repeater, an access point (AP), a radio access point, a Remote Radio Unit (RRU), a Remote Radio Head (RRH), a Remote Antenna Unit (RAU), a multi-standard radio (MSR) radio node such as MSR BS nodes in a distributed antenna system (DAS), a SON node, an Operations and Maintenance (O&M) node, an OSS, an MDT node, a Core network node, a Mobility Management Entity (MME), and the like.

Further, in some instances the description of embodiments may use the term "airplane". However, this is not intended to limit the invention in any way, and any such usage should be construed more broadly, for example as if the term "aircraft" (which encompasses not only airplanes, but other flying craft) had been used.

In some embodiments, aspects utilized in Single Frequency Networks (SFNs) are employed. In an SFN, multiple network nodes transmit the same information on the same carrier frequency and use the same cell identity in an area that may be wider than a single node can cover. Although traditionally used in Long Term Evolution (LTE) deployments for multicast broadcast, the term has been extended in recent 5G studies conducted by the Third Generation Partnership Project (3GPP) to also include dedicated communication in a cell that may be managed by several network nodes in a cooperative manner, where the wireless communication device is aware only of being in a particular cell and not aware of which network node it is communicating with. An SFN may involve several eNodeBs.

In some embodiments, aspects involve the use of a combined cell, which is a cell comprising a network node with multiple antenna nodes, with fully or partially overlapping coverage. In its simplest form a combined cell corresponds to an SFN with the same information transmitted from all antenna nodes, and in more elaborate forms time and frequency resources may be reused for example, in spatial diversity multiplexing schemes. A combined cell may be a special case of an SFN with only one eNodeB managing the SFN cell.

In an aspect of the technology described herein, it is observed that a new standard, called "Automatic Dependent Surveillance—Broadcast Out" (ADS-B OUT) has been or is on the way to being adopted in several parts of the world for the purpose of replacing Secondary Surveillance Radar (SSR) used by air traffic control (ATC). The existing system, SSR, is based on having a radar station ping an aircraft transponder (transmitter-responder) by which the transponder responds by sending information about the aircraft's identity, altitude, and the like. This allows ATC to track the aircraft and guide them to avoid collisions.

The newer system, ADS-B OUT, differs from SSR in that information is broadcast from the airplane periodically, without first being triggered by a radar pulse.

Information contained in the broadcast comprises (but is not limited to):
  Airplane identity and call sign
  GPS-based position (latitude, longitude)
  Altitude
  GPS-based time at which position and altitude were determined Ground stations and proximal airplanes receive the broadcasts and relay them to the ATC facility that is responsible for that airspace. The system is less expensive than SSR since no radar stations are needed, and is up to 200 times more accurate, yielding a tolerance of 5.1 m with respect to position. The broadcast signals reach up to 280 km. The system can also be used when airplanes are taxiing on ground.

The use of ADS-B OUT has already been mandated in Canadian and Australian airspaces, is mandated for use in European airspace for large aircraft starting in 2015 and for all aircraft starting in 2017, and is mandated for use in U.S. airspace starting in 2020. It is already mandated for some or all of the airways in Hong-Kong, Singapore, Vietnam, Taiwan, and Indonesia, and trials have been carried out in some countries such as South Korea and China. It is currently unclear when it will be mandated in the entire Asia-Pacific region, but although not mandatory the use of ADS-B is generally allowed. All major aircraft vendors now ship aircraft prepared with wiring for installment of ADS-B equipment and connection to the onboard flight navigation system and a certified Global Positioning System (GPS) receiver.

FIG. 1 illustrates an ADS-B deployment. Each airplane 101-1, 101-2 determines its position based on signals received from satellites that are part of a global navigation satellite system (GNSS), such as the United States' NAVSTAR GPS and the Russian GLONASS. Information indicating the airplane's identity, position, altitude and the time at which the coordinates were determined, is broadcast periodically and is received by a ground station 105 (and also by nearby airplanes). Once received by the ground station 105 the information is routed (e.g., through a communications network 107) to the ATC facility 109 responsible for that part of the airspace.

ADS-B OUT broadcasts can be received by aviation enthusiasts by using inexpensive equipment; a DVB-T USB dongle and open source software is all that is needed, at a cost of less than 20€. Professional grade ADS-B OUT receivers can be acquired for around 800€ including taxes. The rather inexpensive equipment has led to there being many ADS-B OUT receivers spread over the globe, and by sharing data with a server world-wide real-time tracking is possible. The most renowned service is Flightradar24, founded in Sweden and relying on 7000 volunteers internationally feeding received ADS-B OUT information to a centralized server. In short, receiving and decoding flight information is easily done and only requires inexpensive equipment. Identity, position and altitude can be determined for any airplane equipped with ADS-B OUT, which soon is to be a requirement in a large part of the global airspace.

In one aspect, the various embodiments described herein receive aircraft identity, position and altitude information that is made available by systems such as (but not limited to) ADS-B OUT, and use it to provide cellular telecommunications system service to a user equipment situated in a first aircraft that is in-flight. For ease of discussion, the description of various embodiments makes reference to ADS-B OUT, but this is not intended to limit the scope of the invention to this particular system. Any technology providing comparable information from airborne aircraft may be employed.

An overview of embodiments consistent with the invention includes the following features:
  The terrestrial network base station receives ADS-B OUT information and thereby detects when an airplane that is to be served is approaching the coverage area.
  When an aircraft is within range for the terrestrial network coverage, the base station directs a beam towards it, and starts transmissions of mandatory signals, allowing a wireless communication device (e.g., an Access Point—"AP" or a UE) onboard the aircraft to carry out random access procedures, by which the terrestrial link is established.
  The base station continuously tracks the aircraft and uses this information to steer its beam and also to determine 1) the Doppler compensation to apply before transmitting on the downlink, and 2) the Doppler compensation to apply on signals received on the uplink.
  When the aircraft is about to leave coverage, the terrestrial base station may, depending on backhaul support, either initiate handover to a neighbor cell (the handover may be "invisible" to the wireless communication device onboard the aircraft, as described further below), redirect with system information to a neighbor cell, redirect without system information to a neighbor cell, or release the connection.
  As an aircraft's movement makes it necessary to handover service from one group of one or more antennas to another, this handover is made invisible to the wireless communication device onboard the aircraft by, for example, employing the same radiofrequency allocation and the same cell ID in both groups of antennas.
  Improved positioning information allows for more precise beamforming, and this in turn allows for increased capacity (i.e., more beams and more precise beams can be used in the same spectrum, hence more airplanes can be served by the same ground station).

These and other aspects will now be described in further detail.

Figure 2:
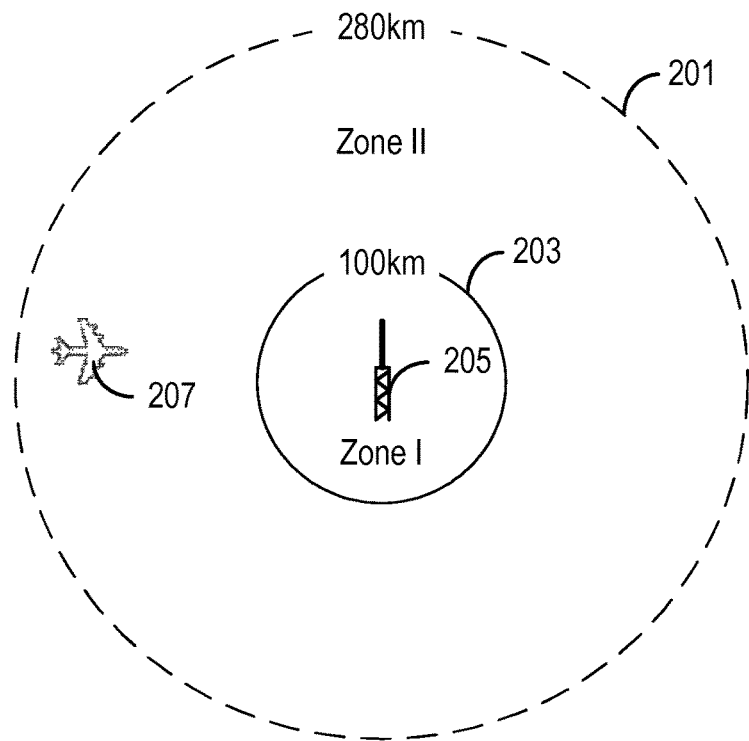
FIG. 2 illustrates the difference in coverage by an ADS-B broadcast and a 4G maximum cell size.

As mentioned above, embodiments utilize navigation information that is broadcast from aircraft, wherein the navigation information comprises an identity of the aircraft, a position of the aircraft, an altitude of the aircraft, and a time value (e.g., a GPS time value) indicating when the position of the aircraft was determined. Such broadcasts can be received up to some 280 to 400 km from the aircraft, thereby exceeding the maximum supported 4G cell radius of 100 km. Hence a base station (or another network node) can detect the aircraft well before it enters the area within which the base station (or other network node) can provide network coverage. FIG. 2 illustrates the difference in coverage by an ADS-B broadcast 201 (referred to herein as Zone I) and a 4G maximum cell size 203 (referred to herein as Zone II). A base station 205 in Zone I will be able to provide network coverage to an aircraft when it is within that zone 203. But that base station 205 will not be able to provide network coverage to an aircraft 207 that is not in Zone I but is elsewhere in Zone II. But because of the range of ADS-B OUT broadcasts, the base station 205 will receive the ADS-B broadcast from the aircraft 207, and can therefore determine whether the aircraft will enter Zone I and, if so, when.

Figure 3:
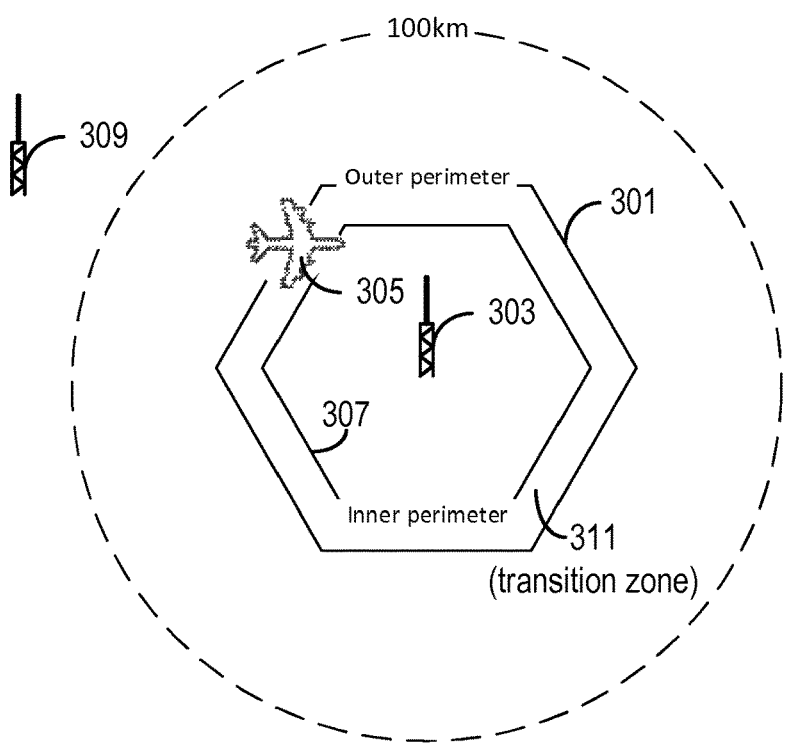
FIG. 3 illustrates an "outer perimeter"—the point at which a flight is considered to be entering (or alternatively, leaving) a network coverage area.

FIG. 3 illustrates what is herein referred to as an "outer perimeter" 301—the point at which a flight is considered to be entering (or alternatively, leaving) a network coverage area. The configuration of the outer perimeter 301 is a network deployment choice by the network operator, and is determined based on the intended coverage of the cell. Crossing the outer perimeter from outside the cell is associated with base station 303 (or other network node) actions such as directing uplink reception (ULRX) and downlink transmission (DLTX) beams towards the aircraft 303 and waiting for random access signaling from the aircraft 305. Crossing the outer perimeter 301 from inside to outside is associated with base station (or other network node) 303 actions such as turning off the beam.

There is also an inner perimeter 307, which, when crossed from inside the cell, triggers the base station (or other network node) 303 to take actions related to handover or handoff. In case there are one or more adjacent neighbor cells (e.g., a cell served by a second base station 309), the zone between the inner and outer perimeter (herein referred to as a transition zone, such as the transition zone 311 depicted in FIG. 3) is a zone where the handover should take place, hence the neighboring target cell should have a partially overlapping such zone.

Figure 4:
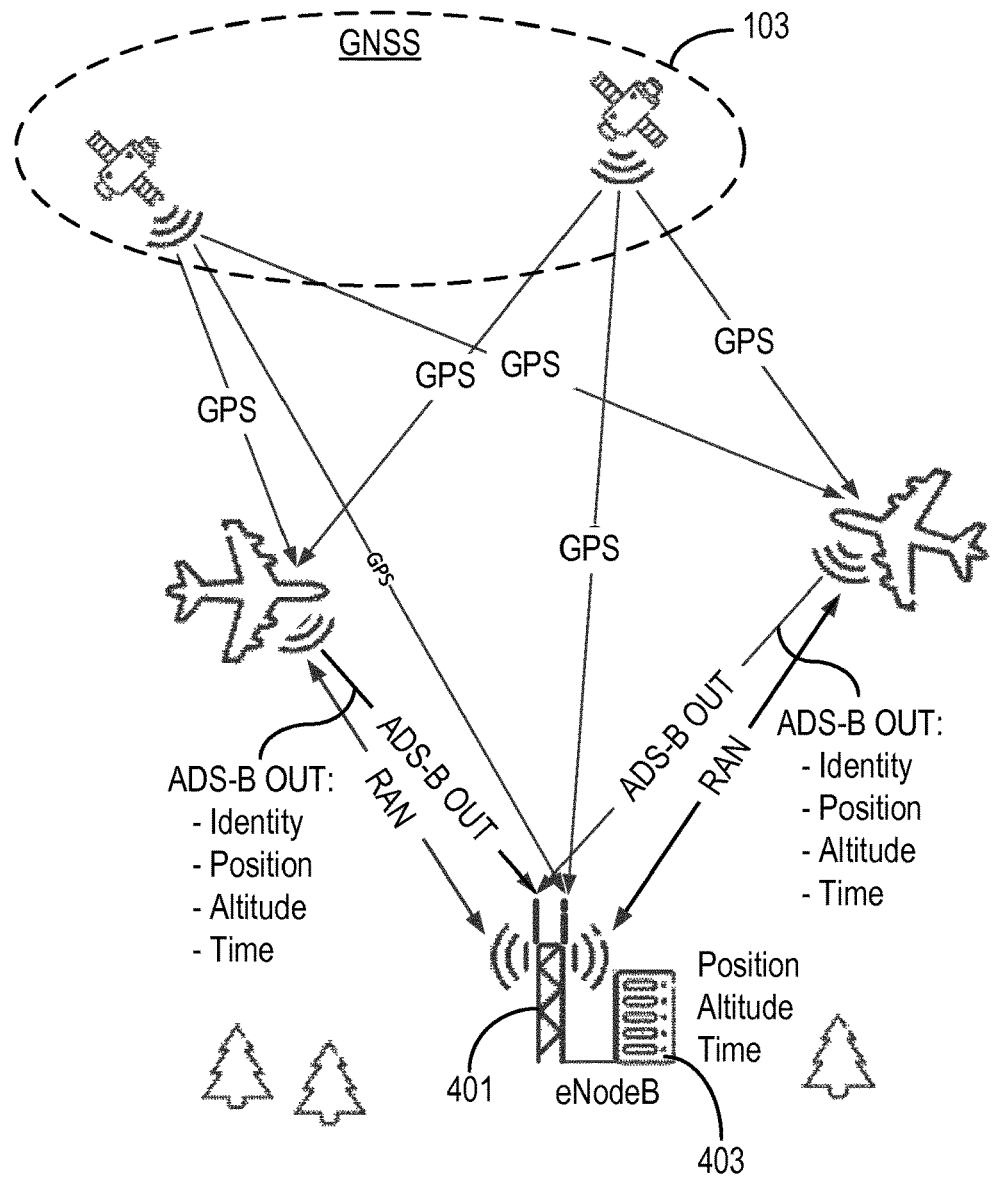
FIG. 4 illustrates a node's acquisition of aircraft position and altitude in accordance with an aspect of inventive embodiments.

An aspect of inventive embodiments regarding a node's acquisition of aircraft position and altitude is illustrated in FIG. 4. Each aircraft receives GPS (or comparable) time information from satellites that are part of a GNSS system 103 and use this information to determine altitude and position. This time, altitude, and position information is included in the ADS-B broadcast from each aircraft, and those broadcasts are received by a base station or comparable node (illustrated in the figure as an eNodeB 401). To enable this reception, the eNodeB 401 is configured to include an aircraft navigation broadcast receiver, which in this particular example, is an ADS-B OUT receiver 403. The eNodeB 401 is configured to additionally receive GPS time, altitude and position from the satellites of the GNSS system 103, and can therefore determine its own position relative to the aircraft. Today's macro cells generally already are configured to have GPS receivers for the purpose of controlling timing, so no extra requirement is imposed by the inventive aspects. As an alternative, the eNodeB's precise location can be determined at the time of installation, and this position information stored locally with the eNodeB 401. In the just-mentioned alternative, a different source (i.e., other than GPS) must be used as a timing reference for all components to control the macro cells' timing.

Figure 5:
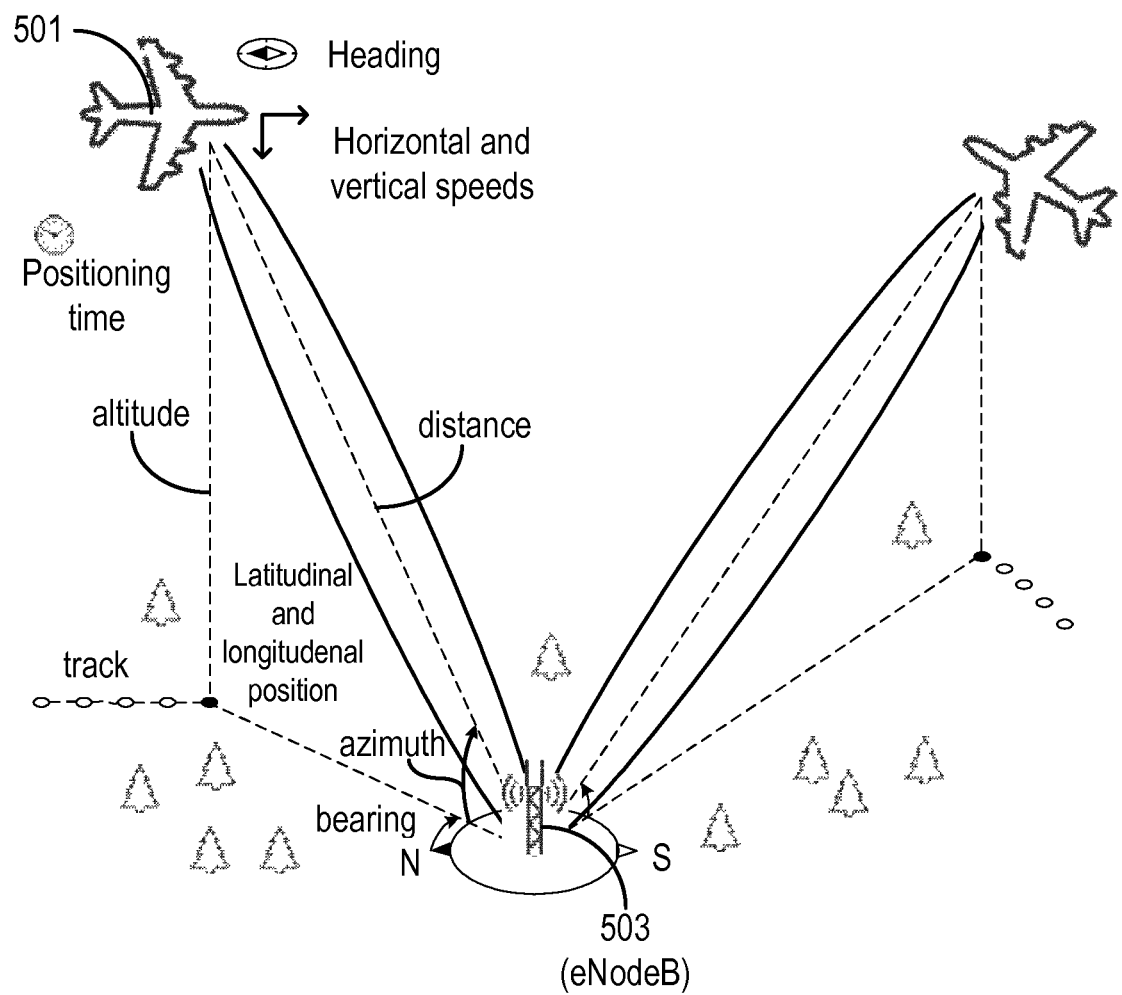
FIG. 5 illustrates navigational terminology used in connection with embodiments of the invention.

Using the position, altitude, and time stamp received from an aircraft via its ADS-B broadcasts, the base station (or another network node; e.g., eNodeB 401) can determine the azimuth, bearing and distance to the airplane. Using two or more ADS-B broadcasts (i.e., received at different times), the base station can determine the 3D course of the airplane, for example as horizontal velocity, vertical velocity, and heading. In FIG. 5, these and other terms are illustrated for an aircraft 501 relative to an eNodeB 503. Knowing the difference in time between the several fixes of the altitude and position provided by the aircraft 501, and the current (or future) time, as acquired via the GPS receiver in the eNodeB 503, the eNodeB can predict the position of the aircraft 501 for the next few seconds. As it receives updated information via ADS-B (position is broadcast once or twice per second, depending on the underlying system), the eNodeB 503 adjusts its prediction model.

Using the predicted information on aircraft position and altitude, the base station directs at least one beam (main lobe) for downlink transmissions (DLTX) towards the aircraft, and at least one beam for uplink reception. The number of beams used may for instance depend on which transmission modes are to be supported in the cell.

In another aspect, since the base station also knows the aircraft's velocity relative to the base station, it can pre-compensate for Doppler shift beforehand in the downlink transmissions, such that the wireless communication device experiences the nominal carrier frequency when receiving the downlink signals. Similarly, the base station can calculate beforehand which Doppler shift it will experience in the transmission received from the airborne wireless communication device on the uplink, and hence can compensate for it in received signals without first having to detect the Doppler shift from the received signal, although such embodiments are not precluded. Hence Doppler shift compensation is not needed by the wireless communication device onboard the aircraft, although such embodiments are not precluded.

In another aspect of some embodiments, in order to fine-tune the orientation of the downlink transmission beam(s) the base station may occasionally use two partially overlapping beams for uplink reception, to determine whether the prediction on the airplane's position and altitude is providing optimal connection, or whether an adjustment is needed. The base station may alternatively occasionally perturb the predicted position and altitude in a controlled manner to see whether the uplink reception improves or degrades, and adjust the prediction model accordingly (here using assumptions on reciprocity between uplink and downlink since it is line-of-sight communication).

The network may be realized as an open, public network that allows subscribers to roaming partners to connect; or the network may be private, allowing connection by only a closed subscriber group (e.g., certified wireless communication devices, such as an access point onboard the aircraft) to become connected, this being to prevent having too many devices initiating random access procedures.

In another aspect of some embodiments, the base station may be pre-configured with the call signs or aircraft identities that it is permitted to serve. Any aircraft not broadcasting one of those call signs or aircraft identities will then be ignored as they pass through the area. In alternative embodiments, the base station directs beams towards any or all of the airplanes currently in its coverage area, regardless of call sign or aircraft identity.

Figure 6:
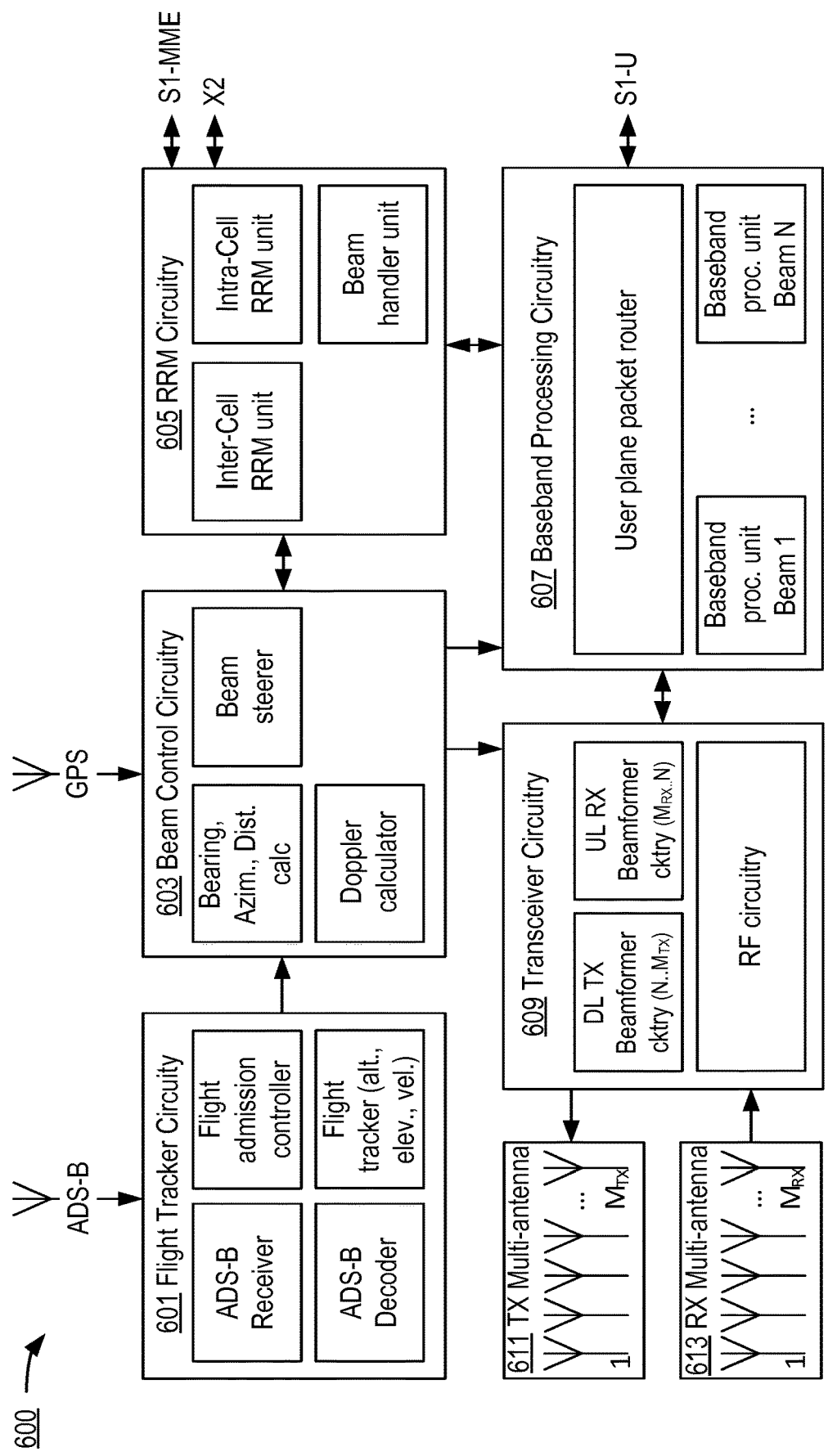
FIG. 6 depicts an exemplary embodiment of an apparatus configured to carry out aspects of the invention.

FIG. 6 depicts an exemplary embodiment of an apparatus 600 configured to carry out aspects of the invention. The exemplary apparatus 600 can be installed as part of a base station (or other network node). For clarity, other components of the base station (or other network node) that are conventional and not relevant to aspects of the invention are not depicted.

The apparatus 600 comprises Flight Tracker circuitry (FT) 601 responsible for tracking airplanes inside the outer perimeter, Beam Control circuitry (BC) 603 responsible for calculating beamforming weights and/or beam control parameters, Radio Resource Management (RRM) circuitry 605 responsible for resource allocation, a Baseband Processing unit (BP) 607 responsible for baseband processing (whole stack L1-L3) and capable of processing a number, N, of communication links in parallel where each link comprises at least one uplink and one downlink beam, Transceiver circuitry (TC) 609 responsible for shaping up to N sets of beams, each using some number, M, of transmission antenna elements ($M_{TX}$ antenna elements) for downlink transmissions, and combining the input from M uplink receiver antenna elements ($M_{RX}$ antenna elements) into N communication links. The apparatus further comprises antenna nodes with $M_{TX}$ antenna elements 611 for downlink transmissions and $M_{RX}$ antenna elements 613 for uplink transmissions. The N communication links are separated spatially, but overlap each other in time and frequency (spatial diversity similar to Multi-User Multiple Input Multiple Output—"MU-MIMO"). Here $M_{RX} \geq N$ and $M_{TX} \geq N$ since otherwise it is not possible to separate the N communication links on the receiver sides.

In some alternative embodiments, adjustment of azimuth and/or bearing may comprise physically changing the position of each antenna node, such as changing tilt and/or orientation to follow the aircraft. In yet other embodiments it may be a combination of physical node position change with modification of amplitude and/or phase of the signals received or transmitted by different antenna elements. Moreover, usage of multiple antenna nodes by one apparatus 600 is not precluded.

The Flight Tracker circuitry 601, Beam Control circuitry 603, RRM circuitry 605, Baseband Processing circuitry 607, and Transceiver circuitry 609 themselves include various circuit components as shown in FIG. 6.

Figure 7A:
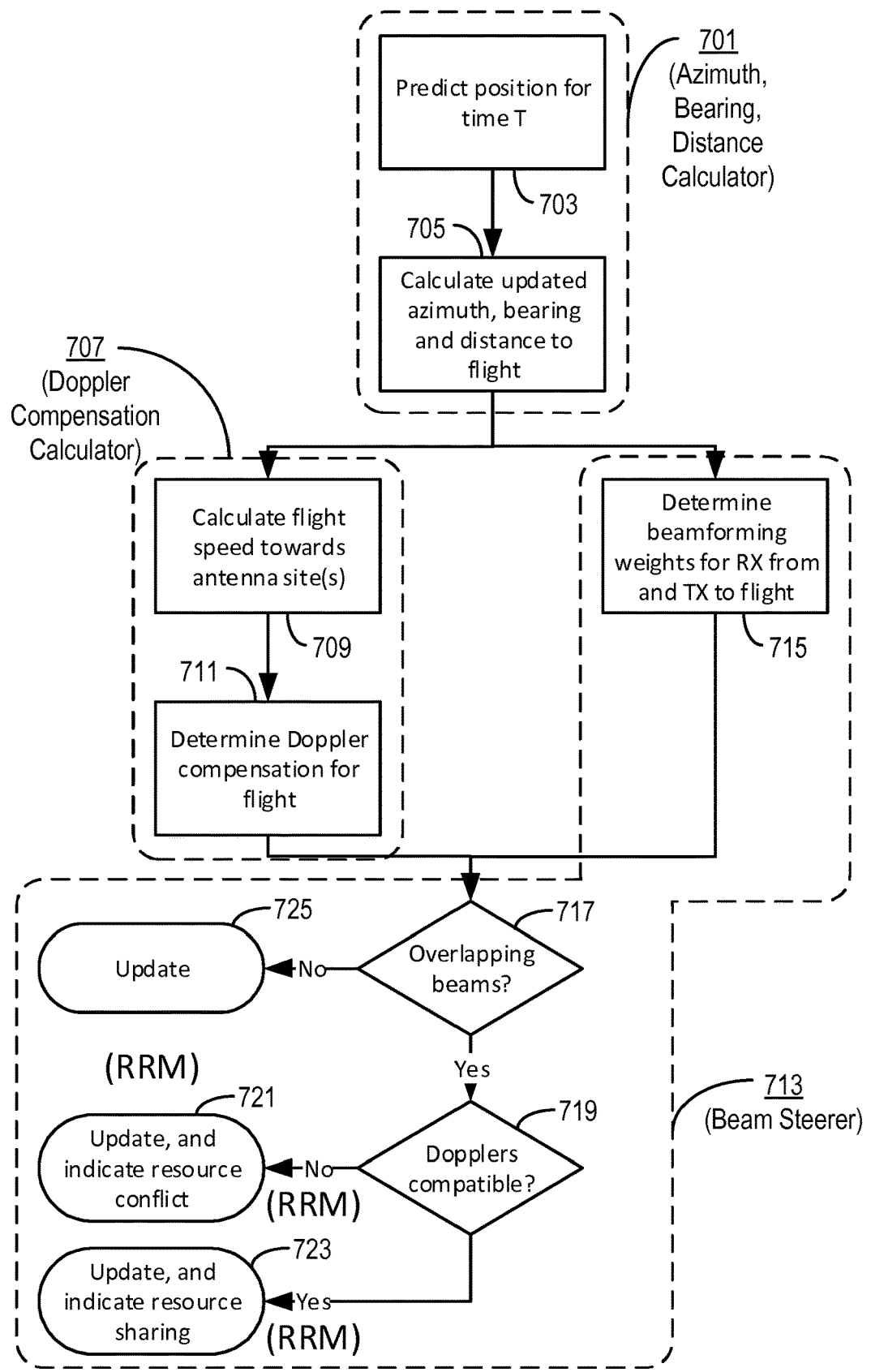
FIGS. 7A through 7E depict functionality carried out by Beam Control circuitry in accordance with some exemplary embodiments.

The Beam Control circuitry 603 is configured to carry out functionality as depicted in FIGS. 7A through 7E. Referring first to FIG. 7A, the Beam Control circuitry's Azimuth, Bearing, and Distance calculator 701 predicts the position of the aircraft for a particular radio frame (e.g., for a particular time T) (step 703) and calculates updated azimuth, bearing, and distance to the aircraft being tracked (step 705). The Beam Control circuitry's Doppler compensation calculator 707 calculates relative velocity between the aircraft and the node's antenna(s) (step 709) and determines the Doppler shift compensation (step 711) that will be used for communicating with the aircraft. The Beam Control circuitry's beam steerer 713 determines the beamforming weights (and/or beam steering control parameter values) that will be used for transmission (downlink), as well as weights for reception (uplink) (step 715). The calculated weights for various aircraft are compared (decision block 717), and if it identifies that two aircraft have overlapping beams (YES path out of decision block 717), it also determines whether the compensating Doppler shifts for the two aircraft are compatible (i.e., they do not exceed some predetermined "acceptable" difference) (decision block 719).

If there are no overlapping beams (NO path out of decision block 717), the Doppler compensation values and beamforming weights are updated with the freshly calculated ones. But otherwise, the beam steerer 713 indicates to the RRM circuitry 605 either that there is a resource conflict due to the two aircraft experiencing different Doppler shifts (NO path out of decision block 719), or else that resource sharing between the two beams should be implemented (YES path out of decision block 719) (i.e., when there is an acceptably small difference between the Doppler compensation needed for one beam compared to the other).

Figures 7B, 7C:
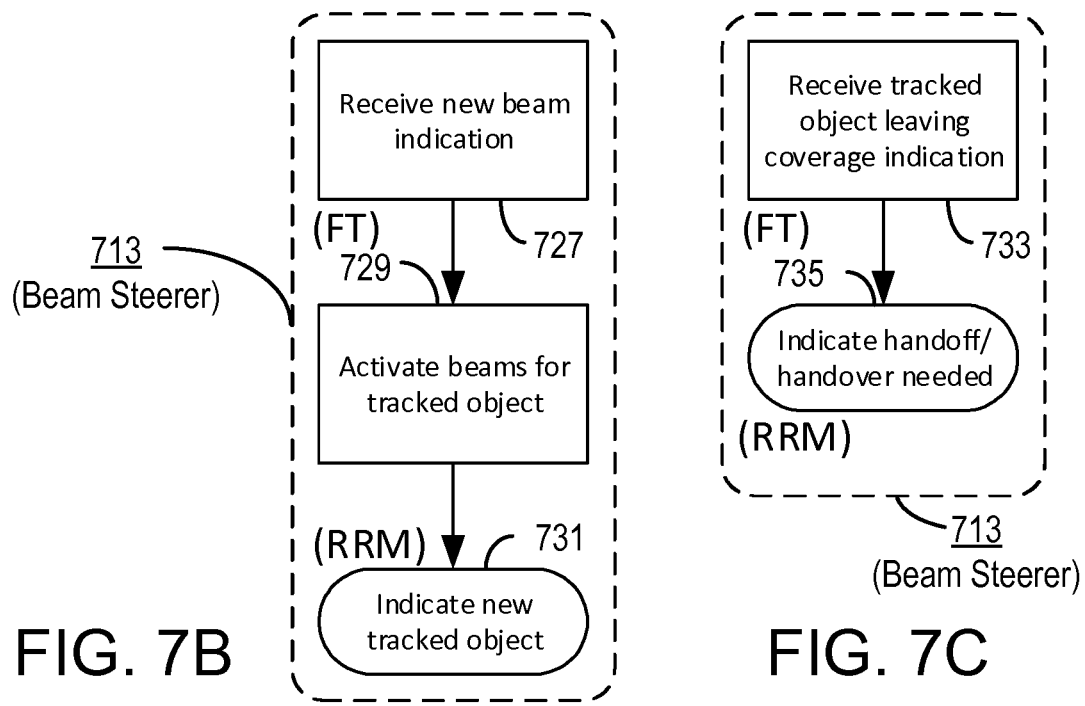

Referring now to FIGS. 7B and 7C, the Beam Control circuitry's beam steerer 713 further acts upon indications from the Flight Tracker circuitry 601 relating to the need for a beam. In the example shown in FIG. 7B, the beam steerer 713 receives an indication from the Flight Tracker circuitry 601 that a new beam is needed (step 727) (e.g., due to a new aircraft entering the outer perimeter 301). In response, the beam steerer 713 activates beams for the newly tracked object (step 729) and sends an indication to the RRM circuitry 605 indicating that there is a newly tracked object (step 731).

In the example shown in FIG. 7C, the beam steerer 713 receives an indication from the Flight Tracker circuitry 601 that a currently tracked object (presently in the coverage area) is leaving the coverage area (step 733). In response, the beam steerer 713 sends an indication to the RRM circuitry 605 indicating that an aircraft is leaving the inner perimeter (step 735). In alternative embodiments, the RRM circuitry 605 is configured to receive, directly from the Flight Tracker circuitry 601, the indication that a currently tracked object (presently in the coverage area) is leaving the coverage area.

Figures 7D, 7E:
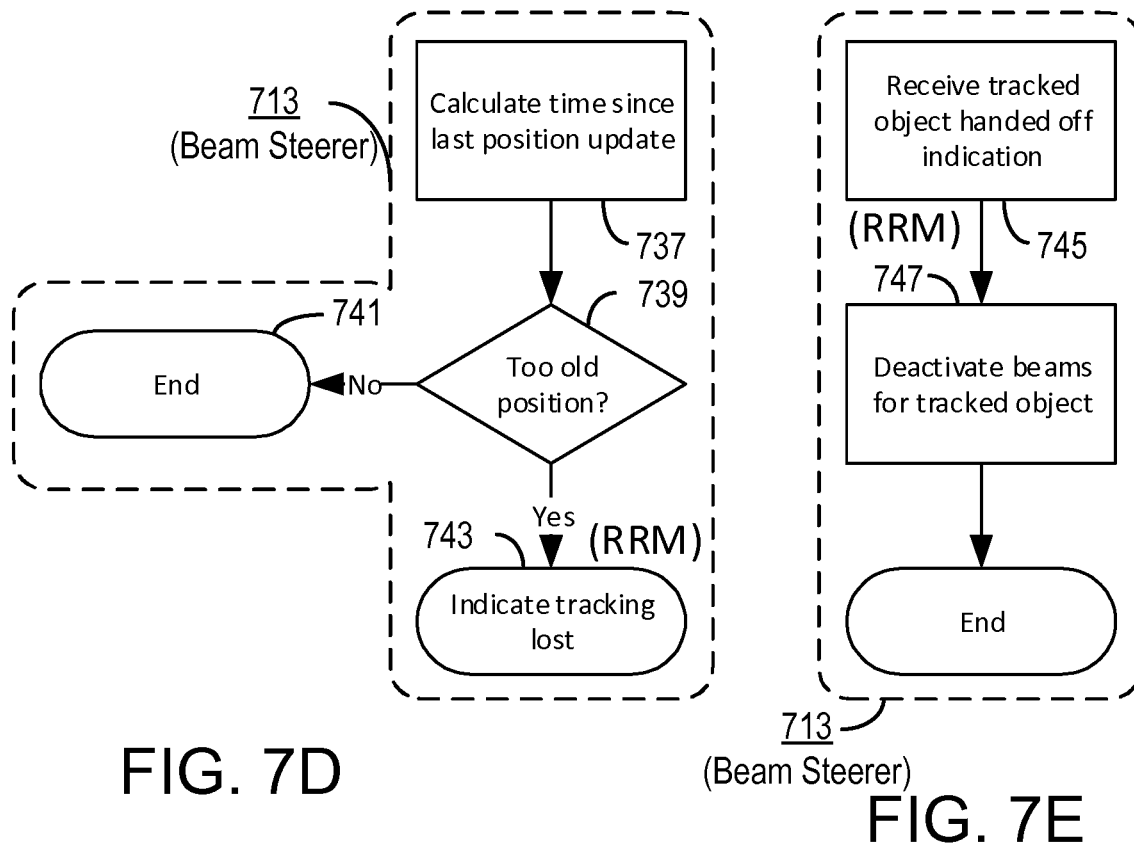

In another aspect, the Beam Control circuitry 601 needs to ensure that it is still accurately aiming the beams at the aircraft. This is illustrated in FIG. 7D, in which the beam steerer 713 calculates how much time has elapsed since the aircraft's last position update was generated (step 737). The calculated amount of time is compared with a predetermined acceptable threshold amount (decision block 739). If the most recent position is not too old (NO path out of decision block 739), no action needs to be taken (step 741). But if the most recent position is too old (YES path out of decision block 739), then the beam steerer 713 sends an indication to the RRM circuitry 605 indicating that tracking has been lost (step 743).

In another aspect, the Beam Control circuitry 601 receives an indication that the tracked object has been handed off (step 745). (The RRM will have performed handover in response to the indication sent by the beam steerer 735 in step 735, discussed above). In response, the beam steerer 713 deactivates the beams associated with the tracked object (step 747).

Figure 8A:
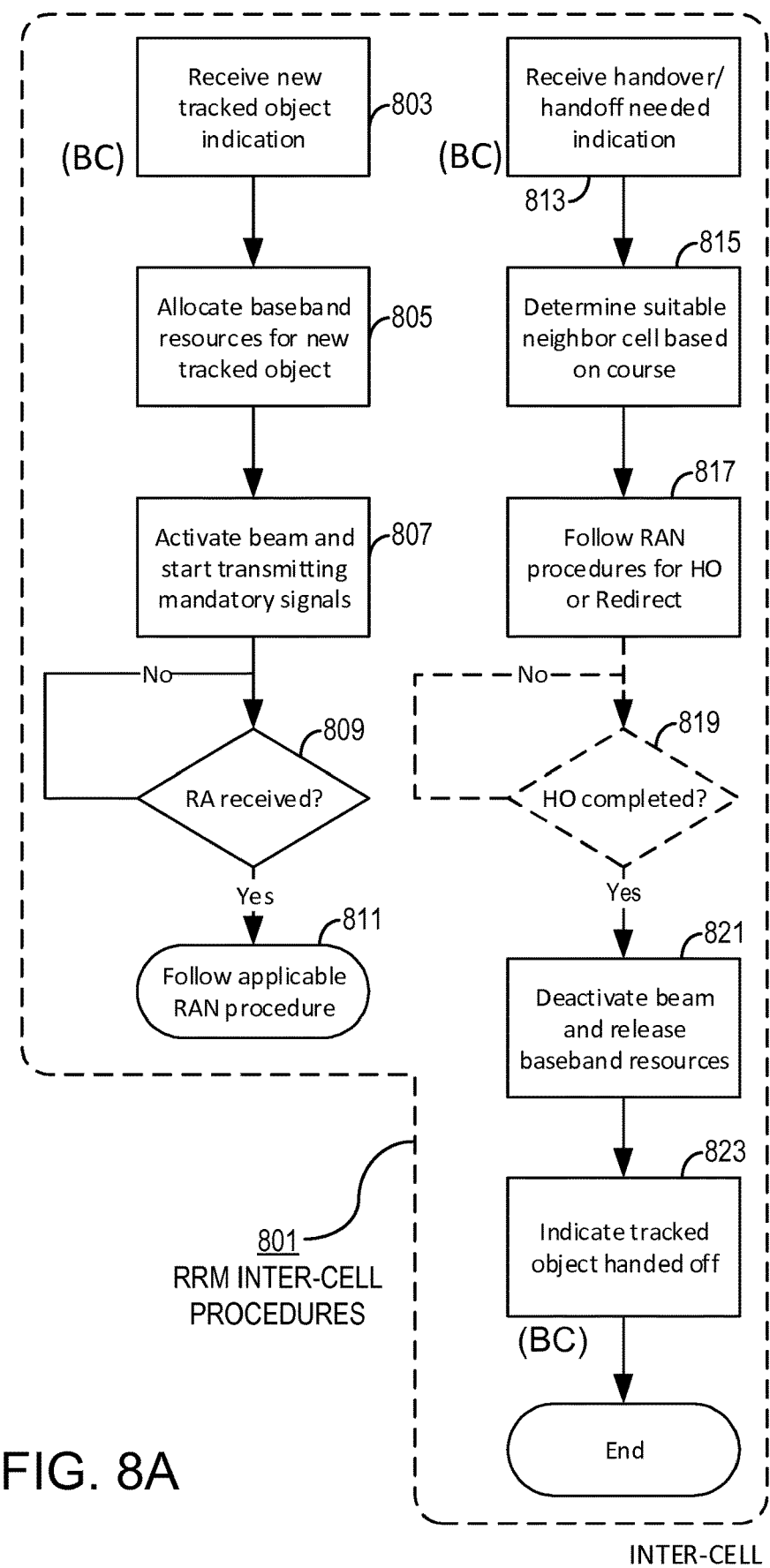
FIGS. 8A and 8B illustrate the functionality of RRM circuitry in accordance with exemplary embodiments.
Figure 8B:
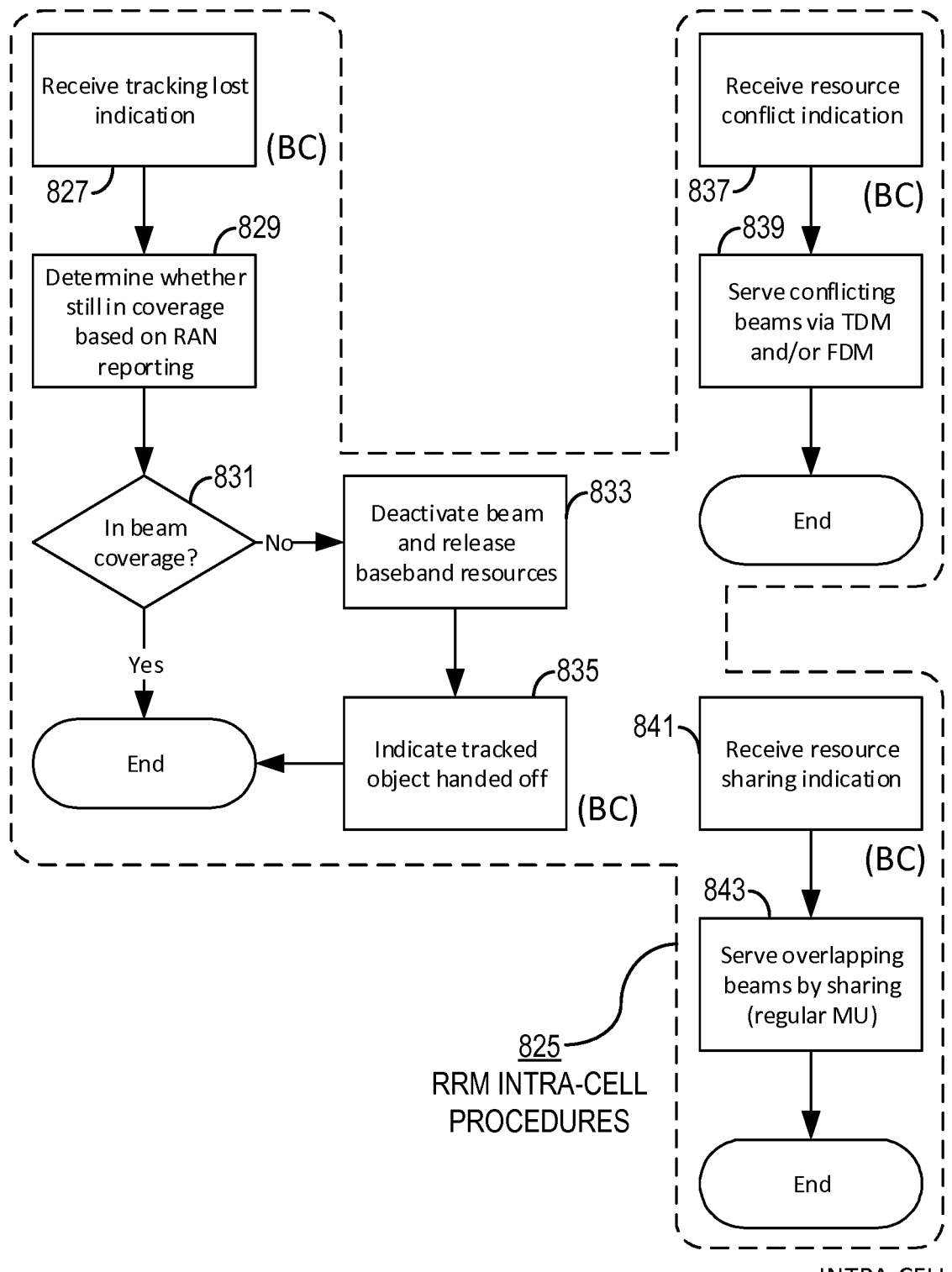

The RRM circuitry 605 handles the radio resource and the baseband processing resources needed to support the in-flight calls. The functionality of the RRM circuitry 605 will now be described with reference to FIGS. 8A and 8B. In one aspect, the RRM circuitry 605 is configured to perform inter-cell functionality 801. In one instance, the RRM circuitry 605 receives the previously-mentioned indication from the Beam Control circuitry 604 that there is a newly tracked object (step 803). In response, the RRM circuitry 605 allocates baseband resources for the newly tracked object (step 805), activates a beam for the object, and starts transmitting mandatory signals that provide wireless communication devices aboard the aircraft with the information necessary to initiate connection to the cell by means of random access procedures (step 807).

The RRM circuitry 605 then monitors received signals to detect whether a random access signal has been received (decision block 809). Monitoring continues (NO path out of decision block 809) until a random access signal has been detected (YES path out of decision block 809). In response, applicable Radio Access Network (RAN) procedures are activated (step 811).

In another instance of inter-cell procedures, the RRM circuitry 605 receives the previously-mentioned indication (from the Beam Control circuitry 603) that a handover of an existing connection is needed (step 813). In response, the RRM circuitry 605 determines a suitable neighbor (target) cell, this being based on the aircraft's tracked course (step 815). The RRM circuitry 605 then follows the RAN procedures for handover (HO) or redirect (step 817). As an optional step (indicated by dashed lines in the figure), the RRM circuitry 605 tests for completion of the handover (decision block 819), and remains in this state so long as handover remains ongoing (NO path out of decision block 819). Once handover has completed (YES path out of decision block 819), or if waiting for handover completion is skipped, the RRM circuitry 605 deactivates the beam and releases baseband resources for the object, and then indicates to the Baseband Control circuitry 603 that the tracked object has been handed off.

In another aspect, the RRM circuitry 605 is configured to perform intra-cell functionality 825. In one instance, the RRM circuitry 605 receives the previously-mentioned indication from the Beam Control circuitry 604 that tracking of an object has been lost (step 827). In response, the RRM circuitry 605 determines, based on RAN reporting, whether the object is still in fact being covered (step 829 and decision block 831). If the answer is "yes" (YES path out of decision block 831), then no further actions need be taken. But if the object is not being covered (NO path out of decision block 831), then the RRM circuitry 605 deactivates the object's beam and releases the object's baseband resources (step 833). The RRM circuitry 605 then sends the previously-mentioned indication to the Beam Control circuitry 603, indicating that the tracked object has been handed off (step 835).

In another aspect of the RRM's intra-cell procedures, the RRM circuitry 605 receives the previously-mentioned indication from the Beam Control circuitry 603 that there is a resource conflict (step 837) (i.e., if different beams supporting respectively different connections will overlap, e.g., due to the locations of different aircraft). The RRM circuitry 605 responds by splitting the cell in each of the concerned beams into two cells of smaller bandwidth (i.e., a Frequency Division Multiplexing (FDM) strategy and/or Time Division Multiplexing (TDM) strategy is used) (step 839). This allows allowing Doppler compensation to be unique to each aircraft.

In order to avoid cluttering the figures, they do no depict procedures corresponding to "end of resource conflict." It will be understood, however, that this is detected when the beams of several aircraft no longer conflict with each other, the actions taken in response thereto are essentially the reverse of what is described here with respect to handling a resource conflict situation. Each aircraft gets the full and exclusive use of its own beam.

In another aspect of the RRM's intra-cell procedures 825, the RRM circuitry 605 receives the previously-mentioned indication from the Beam Control circuitry 603 that resource sharing between two tracked objects should be employed (step 841). In response, the RRM circuitry 605 serves the overlapping beams by transmitting the same information (e.g., same cell identifier) in both overlapping beams and to both aircraft, and sharing the radio resources in a manner similar to that which is used when serving terrestrial equipment (i.e., by giving each of them a separate allocation in non-overlapping time or/and frequency) (step 843).

Splitting the cell into two cells requires that particular steps be taken to transfer the wireless communication device(s) from one bandwidth to another. It may be accomplished for instance by procedures similar to a redirect with System Information (SI) but then comes with a significant overhead. An alternative is to, for example, employ carrier aggregation, and have for example two cells of 10 MHz each. When there is no conflict, the aircraft is scheduled to utilize both cells, but when there is a conflict the aircraft gets scheduled only in its Primary Cell, leaving the other cell for use by the conflicting aircraft.

Turning now to other aspects of the device 600, the baseband processing circuitry 607 is similar to legacy components previously used in the art, except for the capability of pre-compensating for Doppler shift both before transmitting on the downlink, and also before processing received samples on the uplink. The capacity (i.e., the number N) depends on how many aircraft are to be served simultaneously. Essentially each of the N communication links acts as a separate cell.

The transceiver circuitry 609 distributes each set of downlink signals associated with a communication link to the MTX transmit antenna elements 611 (comprised in one or more antenna nodes). For uplink reception, the transceiver circuitry 609 combines the signals from MRX receive antenna elements 613 into N sets of uplink signals, each set associated with a particular communication link.

The discussion will now focus on further aspects relating to handover of a connection between the land-based network and an air-borne wireless communication device. Because of the speed of travel, the wireless communication device passes from the coverage area of one node (e.g., antenna node, eNodeB, or other) to another much more quickly than a device travelling on the ground, so handovers are required much more frequently. Since wireless communication devices conventionally participate in the handover process, they would find themselves faced with significantly more overhead activity relating to frequent handovers while airborne. For this reason, it is desirable to perform handovers in a way such that it is handled entirely by the network, without the airborne wireless communication device being made aware that the handovers are taking place.

Accordingly, this and/or related issues are addressed in an aspect of embodiments consistent with the invention. These embodiments utilize for airborne connections, characteristics of Single Frequency Networks (SFNs) that are used for, as an example, broadcasting information to many recipient land-based wireless communication devices. It will be recognized that, whereas the motivation for using SFNs has conventionally been to efficiently utilize radio resources to distribute the same information to many geographically dispersed communication devices, the present inventors have recognized that SFN principles (along with others) can be adapted to enable an airborne wireless communication device to experience seamless connectivity as it passes from one coverage area to another, all without being made aware of the handovers.

Single frequency network (SFN), that is, a land network in which multiple cells transmit information simultaneously, has been used in systems such as LTE. But conventional SFN is not sufficient to support a link to an airborne wireless device because the transmissions from the different ground sites need to independently adjust:

Doppler pre-compensation,
Transmission timing,
Transmit power
Beam direction,
Beam azimuth, all this being based on the relative position and relative velocity of the aircraft to each respective base station or site. Similar adaptations are needed for reception. As mentioned above, an aspect of exemplary embodiments is that wireless devices onboard the aircraft shall not be aware of being handed over from one site to another—it will instead appear to the device that it is in the same cell all the time, and it is just a new path with a timing within the cyclic prefix (4.7 us) that pops up when a new beam is lit up. This reduces handover-related signaling overhead.

In some embodiments, the SFN is realized on a per aircraft basis, such that that different aircraft see different cell identities.

In an aspect of some but not necessarily all embodiments, the same cell identity is used for all beams, in something that resembles multi-user MIMO: Aircraft are spatially separated and hence served by different beams, so the same time-frequency resources can be used simultaneously by all beams.

It was earlier mentioned that a conflict can arise when beams serving respective ones of several aircraft are oriented in the same direction and azimuth. To handle this conflict, the resources of each beam can be divided between the different aircraft in different ways, depending on circumstances:

If similar Doppler compensation is being used in the separate beams, the technology share resources by allocating the same spectral resources (e.g., bandwidth and frequency) to users in both aircraft.

If the separate beams use different Doppler compensation amounts, the technology splits up the total bandwidth into, for example, a Primary Cell (PCell) and Secondary Cell (SCell) and employs a carrier aggregation strategy in which it stops scheduling wireless communication device activity in the SCell during the time when there are two aircraft in the beam. Further, the SCell for wireless communication devices onboard one aircraft is then the PCell for wireless communication devices onboard another aircraft, and vice versa. Wireless communication devices onboard one aircraft would need to get Medium Access Control (MAC) signaling to change the order of PCell and SCell at some point in time.

In another aspect, when several base stations, eNodeBs or comparable nodes are involved in a handover (it being recognized that in some embodiments, handovers can occur between different antenna nodes all controlled by a same base station, eNodeB, or comparable node), these nodes have their clocks synchronized via GPS (~33 ns accuracy) and thus have a common reference time. The source node sends information to the target node, the information indicating the particular aircraft identity of the aircraft that is to be served, and sends information about the start of the radio frame. The source node may also send parameters indicating the predicted course, parameters related to transmission power settings (on top of compensation for distance), Channel Quality Index (CQI) offsets, and the like, as determined in outer loop link adaptation. The target node may also receive from the source node other information about the wireless devices that are being served by that beam.

In response to the information received from the source node, the target node begins tracking the identified aircraft, and when signaled by the source node, the target directs a beam towards the aircraft. This beam shall look just like a new path of the source node's signal, with the same Doppler shift, timing that is close to the other beam's timing, and similar power. Consequently, wireless devices aboard the aircraft will not recognize this as a handover.

In still other aspects of some but not necessarily all embodiments, different approaches may be used regarding transmission of data on the Physical Downlink Shared Channel (PDSCH). In one embodiment, joint transmission is employed, by which data is sent from both nodes simultaneously. The feasibility of this approach depends on the capacity of, and load on the system-defined X2 interface between the two nodes.

In a different embodiment, the source node stops transmitting data and redirects the data stream to the target node, which then starts to transmit the redirected data stream. The benefit is that the forwarding of data over the X2 interface can be avoided.

In yet another embodiment, the strategy of whether to jointly transmit data or whether to transmit from only one node at a time is decided dynamically, from time to time depending on the current load on the X2 interface.

Further aspects of embodiments will now be described with reference to FIG. 9, which in one respect is a flow chart of steps/processes performed by circuitry in accordance with some but not necessarily all exemplary embodiments consistent with the invention. In another respect, FIG. 9 can be considered to depict exemplary means 900 comprising the various illustrated circuitry (e.g., hard-wired and/or suitably programmed processor) configured to perform the described functions.

Figure 9:
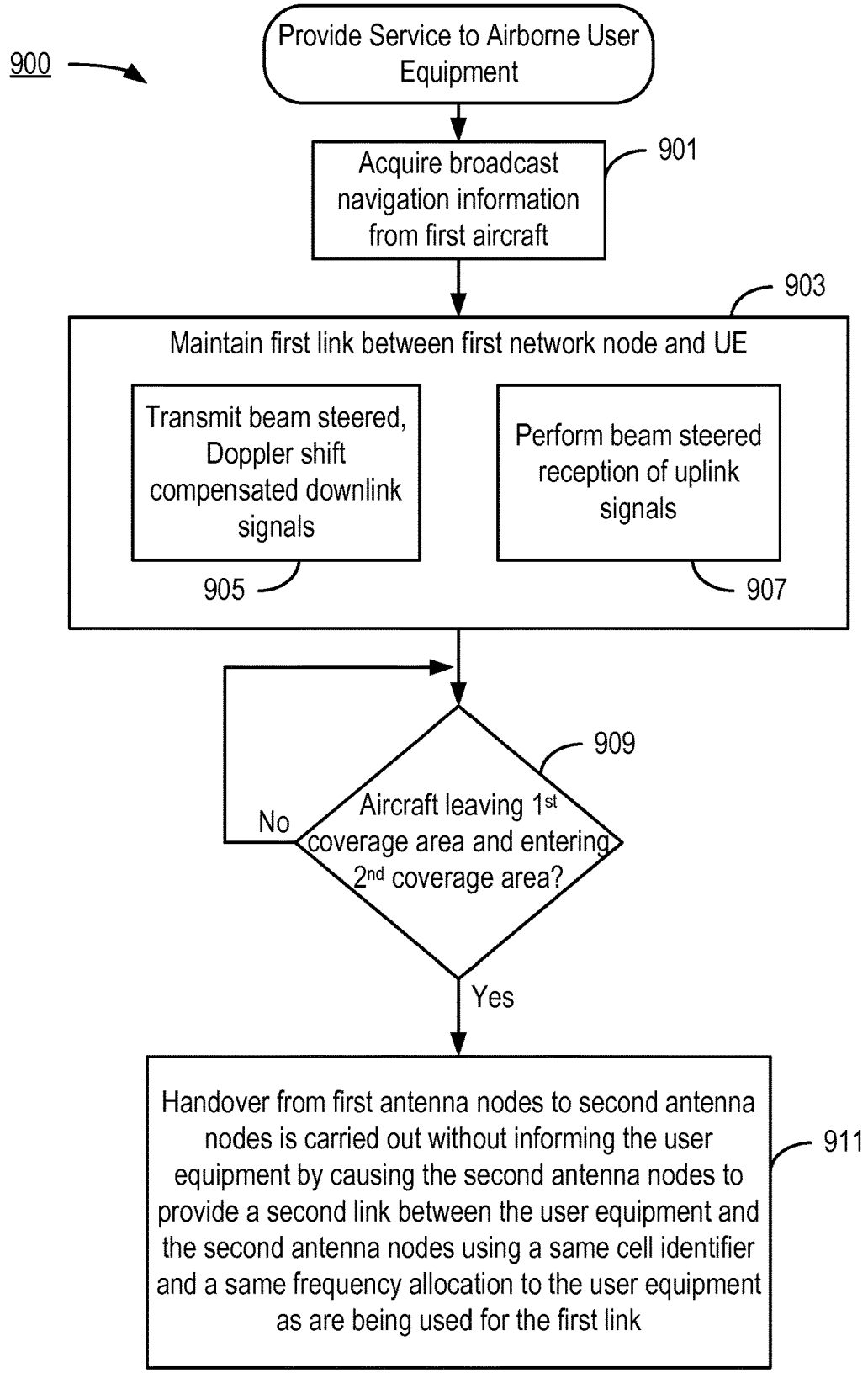
FIG. 9 is a flow chart of steps/processes performed by circuitry in accordance with some but not necessarily all exemplary embodiments consistent with the invention.

The functionality illustrated in FIG. 9 is performed by a first network node of a terrestrial cellular telecommunications system, and is for providing cellular telecommunications system service to a user equipment situated in a first aircraft that is in-flight. In one aspect, the first network node periodically acquires, via an aircraft navigation broadcast receiver, acquired navigation information transmitted from the first aircraft (step 501), wherein the acquired navigation information comprises:

an identity of the first aircraft;
a position of the first aircraft;
an altitude of the first aircraft; and
a time value indicating when the position of the first aircraft was determined.

The first network node further maintains a first link between the first network node and the user equipment (step 903). This includes transmitting beam steered, Doppler shift compensated downlink signals (step 905). It further includes performing beam steered reception of uplink signals (step 907). The beam steering is directed toward the first aircraft based on the periodically acquired navigation information, and wherein Doppler shift compensation is based on one or more determinations of relative velocity between the first aircraft and one or more first antenna nodes associated with the first network node, and is adapted to compensate for a Doppler shift experienced by the user equipment such that the user equipment experiences a nominal carrier frequency when receiving transmissions from the one or more first antenna nodes;

In another aspect, if the first network node detects that the first aircraft will be leaving a first coverage area that is served by the one or more first antenna nodes and will be entering a second coverage area that is served by one or more second antenna nodes (YES path out of decision block 909), it responds by causing the one or more second antenna nodes to provide a second link between the user equipment and the one or more second antenna nodes using a same cell identifier and a same frequency allocation to the user equipment as are being used for the first link so that handover from the one or more first antenna nodes to the one or more second antenna nodes is carried out without informing the user equipment (step 911).

The various embodiments provide a number of advantages over conventional techniques. These include:

- The terrestrial network operator becomes independent of a third party. There are only two parties: the terrestrial network operator (spectrum owner) and the airline operator.
- Energy is saved because the terrestrial node is monitoring when and where a beam is to be active. If there are no aircraft in the coverage area, the cell can be completely silent.
- Complexity of the wireless communication device (e.g., an AP and/or one or more UEs onboard the aircraft) can be kept low because no Doppler compensation or connection to other systems (such as the navigation system) is necessary. Hence it becomes less expensive to equip aircraft with such wireless communication devices.
- More accurate positioning allows for narrower beams which may increase capacity by allowing nearby aircraft to be served with separate beams, and by allowing more beams to share the same spectrum.

The invention has been described with reference to particular embodiments. However, it will be readily apparent to those skilled in the art that it is possible to embody the invention in specific forms other than those of the embodiment described above.

For example, in some embodiments, beam-forming for downlink transmissions can be fine-tuned by using two partially overlapping beams for uplink reception and determining therefrom whether accuracy of prediction of position and altitude of the first aircraft can be improved. This functionality is somewhat similar to existing technology in which a Wideband Code Division Multiple Access (WCDMA) UE reports two or more precoder options, with selection being based on which of the options is best as indicated by some predefined metric.

Thus, the described embodiments are merely illustrative and should not be considered restrictive in any way. The scope of the invention is further illustrated by the appended claims, rather than only by the preceding description, and all variations and equivalents which fall within the range of the claims are intended to be embraced therein.

The invention claimed is:

1. A method of providing cellular telecommunications system service to a user equipment situated in a first aircraft that is in-flight, wherein the method is performed by a first network node of a telecommunications system, the method comprising:
   periodically acquiring, via an aircraft navigation broadcast receiver, acquired navigation information transmitted from the first aircraft, wherein the acquired navigation information comprises:
   a position of the first aircraft;
   an altitude of the first aircraft; and
   a time value indicating when the position of the first aircraft was determined;
   maintaining a first link between the first network node and the user equipment by transmitting beam steered, Doppler shift compensated downlink signals, and by performing beam steered reception of uplink signals, wherein beam steering is directed toward the first aircraft based on the periodically acquired navigation information, and wherein Doppler shift compensation is based on one or more determinations of relative velocity between the first aircraft and one or more first antenna nodes associated with the first network node, and is adapted to compensate for a Doppler shift experienced by the user equipment;
   detecting that the first aircraft will be leaving a first coverage area that is served by the one or more first antenna nodes and will be entering a second coverage area that is served by one or more second antenna nodes, and responding by performing a handover that is invisible to the user equipment, wherein performing the handover that is invisible to the user equipment comprises causing the one or more second antenna nodes to provide a second link between the user equipment and the one or more second antenna nodes using a same cell identifier and a same frequency allocation to the user equipment as are being used for the first link.

2. The method of claim 1, comprising:
fine-tuning beam-forming for downlink transmissions by using two partially overlapping beams for uplink reception and determining therefrom whether accuracy of prediction of position and altitude of the first aircraft can be improved.

3. The method of claim 1, comprising:
fine-tuning beam-forming for downlink transmissions by perturbing a present prediction of position and altitude of the first aircraft in a controlled manner and detecting whether uplink reception improves or degrades, and adjusting a beam-forming prediction model based on said detecting.

4. The method of claim 1, comprising:
serving, via a third link, a second user equipment situated in a second aircraft that is in-flight, wherein the third link is supported by a beam of downlink transmissions and beam-steered reception of uplink transmissions, all directed at the second aircraft, and
wherein the third link uses a different cell identifier than is being used for the first link.

5. The method of claim 4, comprising:
in response to the beam of downlink transmissions and beam-steered reception of uplink transmissions directed at the second aircraft being oriented in a same direction as a beam of downlink transmissions and beam-steered reception of uplink transmissions directed at the first aircraft, employing carrier aggregation techniques in which:
the beam of downlink transmissions and beam-steered reception of uplink transmissions directed at the first aircraft is associated with a first set of spectral resources;
the beam of downlink transmissions and beam-steered reception of uplink transmissions directed at the second aircraft is associated with a second set of spectral resources, different from the first set of spectral resources;
the first set of spectral resources are allocated as primary cell resources to the user equipment aboard the first aircraft and are allocated as secondary cell resources to the user equipment aboard the second aircraft; and
the second set of spectral resources are allocated as primary cell resources to user equipment aboard the second aircraft and are allocated as secondary cell resources to user equipment aboard the first aircraft.

6. The method of claim 1, comprising:
prior to activating transmission of beam steered, Doppler shift compensated downlink signals, periodically acquiring, via the aircraft navigation broadcast receiver, initially acquired navigation information transmitted from the first aircraft;

predicting, from the initially acquired navigation information, that the aircraft will, at a predicted time, enter an outer perimeter of the coverage area that is under control of the network node; and activating the maintaining of the first link at the predicted time.

7. The method of claim 6, wherein the navigation information further comprises an identity of the first aircraft, and wherein activating the maintaining of the first link at the predicted time comprises:

using the identity of the first aircraft to determine whether the first aircraft is to be served when crossing the outer perimeter of the coverage area that is under control of the network node.

8. The method of claim 1, comprising:

determining, from the relative velocity of the first aircraft towards the one or more first antenna nodes, a Doppler shift predicted to be experienced by the one or more first antenna nodes when receiving signals transmitted by the user equipment; and applying Doppler shift compensation to a random access preamble received from the user equipment, wherein the applied Doppler shift compensation is based on the Doppler shift predicted to be experienced by the one or more first antenna nodes when receiving signals transmitted by the user equipment.

9. The method of claim 1, comprising:

detecting an amount of Doppler shift in a random access preamble received from the user equipment; and applying Doppler shift compensation to the random access preamble received from the user equipment, wherein the applied Doppler shift compensation is based on the detected amount of Doppler shift in the random access preamble received from the user equipment.

10. The method of claim 1, comprising:

ceasing maintenance of the first link in response to one or more of:

the first network node detecting that the first aircraft has left the outer perimeter of the coverage area that is under control of the first network node; and the first network node no longer receiving navigation information from the aircraft.

11. The method of claim 1, comprising:

serving, via a second link, a second user equipment situated in a second aircraft that is in-flight, wherein the second link is supported by a beam of downlink transmissions and beam-steered reception of uplink transmissions, all directed at the second aircraft, and wherein:

the beam of downlink transmissions and beam-steered reception of uplink transmissions, all directed at the second aircraft does not overlap with a beam of downlink transmissions and beam-steered reception of uplink transmissions directed at the first aircraft; and a cell identifier used for the first link is the same as a cell identifier used for the second link.

12. An apparatus for providing cellular telecommunications system service by a first network node of a telecommunications system to a user equipment situated in a first aircraft that is in-flight, the apparatus comprising:

circuitry configured to periodically acquire, via an aircraft navigation broadcast receiver, acquired navigation information transmitted from the first aircraft, wherein the acquired navigation information comprises:

a position of the first aircraft;
an altitude of the first aircraft; and
a time value indicating when the position of the first aircraft was determined;

circuitry configured to maintain a first link between the first network node and the user equipment by transmitting beam steered, Doppler shift compensated downlink signals, and by performing beam steered reception of uplink signals, wherein beam steering is directed toward the first aircraft based on the periodically acquired navigation information, and wherein Doppler shift compensation is based on one or more determinations of relative velocity between the first aircraft and one or more first antenna nodes associated with the first network node, and is adapted to compensate for a Doppler shift experienced by the user equipment;

circuitry configured to detect that the first aircraft will be leaving a first coverage area that is served by the one or more first antenna nodes and will be entering a second coverage area that is served by one or more second antenna nodes, and is configured to respond by performing a handover that is invisible to the user equipment, wherein performing the handover that is invisible to the user equipment comprises causing the one or more second antenna nodes to provide a second link between the user equipment and the one or more second antenna nodes using a same cell identifier and a same frequency allocation to the user equipment as are being used for the first link.

13. The apparatus of claim 12, comprising:

circuitry configured to fine-tune beam-forming for downlink transmissions by using two partially overlapping beams for uplink reception and determining therefrom whether accuracy of prediction of position and altitude of the first aircraft can be improved.

14. The apparatus of claim 12, comprising:

circuitry configured to fine-tune beam-forming for downlink transmissions by perturbing a present prediction of position and altitude of the first aircraft in a controlled manner and detecting whether uplink reception improves or degrades, and adjusting a beam-forming prediction model based on said detecting.

15. The apparatus of claim 12, comprising:

circuitry configured to serve, via a third link, a second user equipment situated in a second aircraft that is in-flight, wherein the third link is supported by a beam of downlink transmissions and beam-steered reception of uplink transmissions, all directed at the second aircraft, and wherein the third link uses a different cell identifier than is being used for the first link.

16. The apparatus of claim 15, comprising:

circuitry configured to respond to the beam of downlink transmissions and beam-steered reception of uplink transmissions directed at the second aircraft being oriented in a same direction as a beam of downlink transmissions and beam-steered reception of uplink transmissions directed at the first aircraft, by employing carrier aggregation techniques in which:

the beam of downlink transmissions and beam-steered reception of uplink transmissions directed at the first aircraft is associated with a first set of spectral resources;

the beam of downlink transmissions and beam-steered reception of uplink transmissions directed at the second aircraft is associated with a second set of spectral resources, different from the first set of spectral resources;

the first set of spectral resources are allocated as primary cell resources to the user equipment aboard the first aircraft and are allocated as secondary cell resources to the user equipment aboard the second aircraft; and the second set of spectral resources are allocated as primary cell resources to user equipment aboard the second aircraft and are allocated as secondary cell resources to user equipment aboard the first aircraft.

17. The apparatus of claim 12, comprising:

circuitry that is operable prior to activating transmission of beam steered, Doppler shift compensated downlink signals, and that is configured to periodically acquire, via the aircraft navigation broadcast receiver, initially acquired navigation information transmitted from the first aircraft;

circuitry configured to predict, from the initially acquired navigation information, that the aircraft will, at a predicted time, enter an outer perimeter of the coverage area that is under control of the network node; and circuitry configured to activate the maintaining of the first link at the predicted time.

18. The apparatus of claim 17, wherein the navigation information further comprises an identity of the first aircraft, and wherein the apparatus comprises:

circuitry configured to activate the maintaining of the first link at the predicted time by using the identity of the first aircraft to determine whether the first aircraft is to be served when crossing the outer perimeter of the coverage area that is under control of the network node.

19. The apparatus of claim 12, comprising:

circuitry configured to determine, from the relative velocity of the first aircraft towards the one or more first antenna nodes, a Doppler shift predicted to be experienced by the one or more first antenna nodes when receiving signals transmitted by the user equipment; and circuitry configured to apply Doppler shift compensation to a random access preamble received from the user equipment, wherein the applied Doppler shift compensation is based on the Doppler shift predicted to be experienced by the one or more first antenna nodes when receiving signals transmitted by the user equipment.

20. The apparatus of claim 12, comprising:

circuitry configured to detect an amount of Doppler shift in a random access preamble received from the user equipment; and circuitry configured to apply Doppler shift compensation to the random access preamble received from the user equipment, wherein the applied Doppler shift compensation is based on the detected amount of Doppler shift in the random access preamble received from the user equipment.

21. The apparatus of claim 12, comprising:

circuitry configured to cease maintenance of the first link in response to one or more of:

the first network node detecting that the first aircraft has left the outer perimeter of the coverage area that is under control of the first network node; and the first network node no longer receiving navigation information from the aircraft.

22. The apparatus of claim 12, comprising:

circuitry configured to serve, via a second link, a second user equipment situated in a second aircraft that is in-flight, wherein the second link is supported by a beam of downlink transmissions and beam-steered reception of uplink transmissions, all directed at the second aircraft, and wherein:

the beam of downlink transmissions and beam-steered reception of uplink transmissions, all directed at the second aircraft does not overlap with a beam of downlink transmissions and beam-steered reception of uplink transmissions directed at the first aircraft; and a cell identifier used for the first link is the same as a cell identifier used for the second link.

23. A nontransitory computer readable storage medium comprising program instructions that, when executed by one or more processors, cause the one or more processors to perform a method of providing cellular telecommunications system service to a user equipment situated in a first aircraft that is in-flight, wherein the method is performed by a first network node of a telecommunications system, the method comprising:

periodically acquiring, via an aircraft navigation broadcast receiver, acquired navigation information transmitted from the first aircraft, wherein the acquired navigation information comprises:

a position of the first aircraft;

an altitude of the first aircraft; and a time value indicating when the position of the first aircraft was determined;

maintaining a first link between the first network node and the user equipment by transmitting beam steered, Doppler shift compensated downlink signals, and by performing beam steered reception of uplink signals, wherein beam steering is directed toward the first aircraft based on the periodically acquired navigation information, and wherein Doppler shift compensation is based on one or more determinations of relative velocity between the first aircraft and one or more first antenna nodes associated with the first network node, and is adapted to compensate for a Doppler shift experienced by the user equipment;

detecting that the first aircraft will be leaving a first coverage area that is served by the one or more first antenna nodes and will be entering a second coverage area that is served by one or more second antenna nodes, and responding by performing a handover that is invisible to the user equipment, wherein performing the handover that is invisible to the user equipment comprises causing the one or more second antenna nodes to provide a second link between the user equipment and the one or more second antenna nodes using a same cell identifier and a same frequency allocation to the user equipment as are being used for the first link.

* * * * *

UNITED STATES PATENT AND TRADEMARK OFFICE
CERTIFICATE OF CORRECTION

PATENT NO. : 10,667,197 B2
APPLICATION NO. : 15/772858
DATED : May 26, 2020
INVENTOR(S) : Axmon et al.

It is certified that error appears in the above-identified patent and that said Letters Patent is hereby corrected as shown below:

In the Specification

In Column 1, Line 9, delete "is a 371 national stage of International" and insert -- is a § 371 national stage entry of International Application Serial No. --, therefor.

In Column 1, Line 12, delete "(which issued" and insert -- (which is issued --, therefor.

In Column 12, Line 26, delete "Beam Control circuitry 601" and insert -- Beam Control circuitry 603 --, therefor.

In Column 12, Line 39, delete "Beam Control circuitry 601" and insert -- Beam Control circuitry 603 --, therefor.

In Column 12, Line 53, delete "Beam Control circuitry 604" and insert -- Beam Control circuitry 603 --, therefor.

In Column 13, Line 22, delete "Beam Control circuitry 604" and insert -- Beam Control circuitry 603 --, therefor.

In Column 14, Line 22, delete "MTX" and insert -- $M_{TX}$ --, therefor.

In Column 14, Line 24, delete "MRX" and insert -- $M_{RX}$ --, therefor.

In Column 15, Line 12, delete "such that that" and insert -- such that --, therefor.

In Column 15, Line 46, delete "(it being" and insert -- (it is being --, therefor.

Signed and Sealed this
Twenty-fourth Day of May, 2022

Katherine Kelly Vidal
*Director of the United States Patent and Trademark Office*